Patented May 14, 1940

2,200,343

UNITED STATES PATENT OFFICE 2,200,343

PROCESS FOR THE DYEING AND PRINTING OF ACETATE ARTIFICIAL SILK

Heinrich Ritter, Frankfort-on-the-Main-Fechenheim, Germany, assignor to General Aniline & Film Corporation, a corporation of Delaware No Drawing. Application May 6, 1938, Serial No. 206,373. In Germany August 28, 1936

6 Claims. (Cl. 8—57)

The present application is in part a continuation of my application Serial No. 159,526, filed August 17, 1937, which relates to condensation products of the diphenylamine series.

My present invention relates to a process for the dyeing and printing of acetate artificial silk by employing as dyestuffs the condensation products of the diphenylamine series of the general formula:

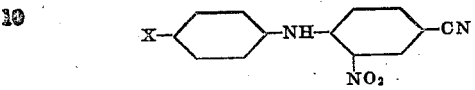

wherein X stands for a member selected from the group consisting of hydrogen and hydroxy and alkoxy radicals. Advantageously the dyeing process is performed with the addition of a suitable dispersing agent. Thereby bright greenish yellow to orange dyeings and printings of excellent fastness to light are obtained.

The dyestuffs employed for the process of the present invention may be prepared for example by condensing 1-halogen-2-nitro-4-cyanobenzene with primary aromatic amines of the benzene series. The 1-halogen-2-nitro-4-cyanobenzenes used as starting materials may be obtained for instance by diazotizing 1-halogen-2-nitro-4-aminobenzenes and replacing the diazo group of the diazo compounds formed by a cyano group according to known methods.

The invention is illustrated, but not limited by the following examples, the parts being by weight and all temperatures in degrees centigrade.

Example 1

Acetate artificial silk is dyed at 60–75° by means of an aqueous suspension of 2-nitro-4-cyanodiphenylamine of the formula:

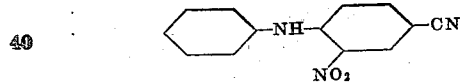

with the addition of soap, whereby the dye-bath is advantageously prepared with the addition of a suitable dispersing agent. Thus yellow dyeings of excellent fastness to light are obtained.

The 2-nitro-4-cyanodiphenylamine may be prepared for example by condensing 1-chloro-2-nitro-4-cyanobenzene with aniline.

By employing 4'-methoxy-4-cyano-2-nitrodiphenylamine (prepared for example by condensing 1-chloro-2-nitro-4-cyanobenzene with 4-methoxy-1-aminobenzene) likewise yellow dyeings and prints on acetate artificial silk are obtained.

Example 2

When acetate artificial silk is dyed in an analogous manner as described in Example 1 by means of a suspension of 4'-hydroxy-4-cyano-2-nitrodiphenylamine of the formula:

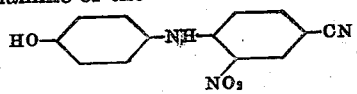

orange-yellow dyeings of excellent fastness to light are obtained.

The 4'-hydroxy-4-cyano-2-nitrodiphenylamine may be prepared for example by condensing 1-chloro-2-nitro-4-cyanobenzene with 4-aminophenol.

I claim:

1. Process for the dyeing and printing of acetate artificial silk which comprises contacting acetate artificial silk with a compound of the diphenylamine series of the general formula:

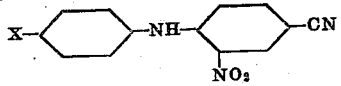

X standing for a member selected from the group consisting of hydrogen and hydroxy and alkoxy radicals, whereby bright greenish yellow to orange dyeings and prints of excellent fastness to light are obtained.

2. Acetate artificial silk dyed or printed with a dyestuff of the general formula:

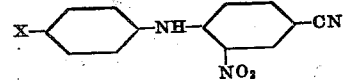

wherein X stands for a member selected from the group consisting of hydrogen and hydroxy and alkoxy radicals.

3. Process for the dyeing and printing of acetate artificial silk which comprises contacting acetate artificial silk with the dyestuff 2-nitro-4-cyanodiphenylamine of the formula:

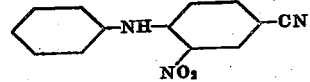

whereby yellow dyeings and prints of excellent fastness to light are obtained.

4. Acetate artificial silk dyed or printed with the 2-nitro-4-cyanodiphenylamine of the formula:

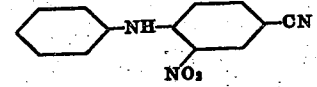

5. Process for the dyeing and printing of acetate artificial silk which comprises contacting acetate artificial silk with the dyestuff 4'-hydroxy-4-cyano-2-nitrodiphenylamine of the formula:

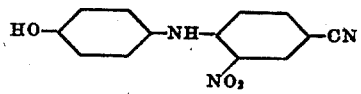

whereby orange-yellow dyeings and prints of excellent fastness to light are obtained.

6. Acetate artificial silk dyed or printed with the 4'-hydroxy-4-cyano-2-nitrodiphenylamine of the formula:

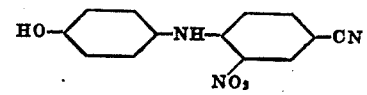

HEINRICH RITTER.